US009692922B2

(12) United States Patent
Shimizu et al.

(10) Patent No.: US 9,692,922 B2
(45) Date of Patent: Jun. 27, 2017

(54) IMAGE READING SUBSTRATE, IMAGE READING DEVICE, AND IMAGE FORMING APPARATUS HAVING EQUAL DISTANCES OF INTERCONNECTS FROM OUTPUT TERMINALS TO HIGH-SPEED SERIAL TRANSMITTING UNIT

(71) Applicant: FUJI XEROX CO., LTD., Tokyo (JP)

(72) Inventors: Kosuke Shimizu, Kanagawa (JP); Kensuke Ohara, Kanagawa (JP); Yuji Kameda, Kanagawa (JP); Kazuaki Shintani, Kanagawa (JP); Yujin Ishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/850,120

(22) Filed: Sep. 10, 2015

(65) Prior Publication Data

US 2016/0277615 A1    Sep. 22, 2016

(30) Foreign Application Priority Data

Mar. 20, 2015  (JP) ................................ 2015-057659
Mar. 20, 2015  (JP) ................................ 2015-057704

(51) Int. Cl.
  *H04N 1/00*      (2006.01)
  *H04N 1/50*      (2006.01)
  *G03G 15/00*     (2006.01)
  *G03G 15/04*     (2006.01)

(52) U.S. Cl.
  CPC ......... *H04N 1/00795* (2013.01); *G03G 15/04* (2013.01); *G03G 15/50* (2013.01); *G03G 15/60* (2013.01); *H04N 1/00572* (2013.01); *H04N 1/50* (2013.01); *G03G 2215/0132* (2013.01)

(58) Field of Classification Search
  CPC .................................................. H04N 1/00795
  USPC ....................................................... 358/1.13
  See application file for complete search history.

(56) References Cited

U.S. PATENT DOCUMENTS

| 2005/0105143 | A1  |  5/2005 | Kagami |
| 2006/0092312 | A1* |  5/2006 | Tanaka ............... H04N 1/00962 348/340 |
| 2008/0121783 | A1* |  5/2008 | Amano ................ H04N 1/0083 250/208.1 |
| 2010/0232834 | A1* |  9/2010 | Ishida ................ H04N 1/02815 399/144 |
| 2013/0083345 | A1* |  4/2013 | Ishida ................ H04N 1/02815 358/1.13 |
| 2013/0286447 | A1* | 10/2013 | Shintani ............ H04N 1/40056 358/475 |

FOREIGN PATENT DOCUMENTS

JP    2005-094513 A    4/2005
JP    2011-223083 A   11/2011

* cited by examiner

*Primary Examiner* — Jacky X Zheng
(74) *Attorney, Agent, or Firm* — Oliff PLC

(57) ABSTRACT

An image reading substrate includes: an image reading unit that assigns read signals of an image to plural output terminals and outputs the read signals; at least one high-speed serial transmitting unit that is connected to the plural output terminals; and an outputting unit that outputs a high-speed serial signal outside, the high-speed serial signal being transmitted from the high-speed serial transmitting unit, in which at least distances of interconnects from the plural output terminals to the high-speed serial transmitting unit are set to be equal.

12 Claims, 14 Drawing Sheets

IMAGE READING SUBSTRATE, IMAGE READING DEVICE, AND IMAGE FORMING APPARATUS HAVING EQUAL DISTANCES OF INTERCONNECTS FROM OUTPUT TERMINALS TO HIGH-SPEED SERIAL TRANSMITTING UNIT

CROSS-REFERENCE TO RELATED APPLICATIONS

This application is based on and claims priority under 35 USC 119 from Japanese Patent Application No. 2015-057659 filed on Mar. 20, 2015 and Japanese Patent Application No. 2015-057704 filed on Mar. 20, 2015.

BACKGROUND

Technical Field

The present invention relates to an image reading substrate, an image reading device, and an image forming apparatus.

SUMMARY

An aspect of the invention provides an image reading substrate comprising: an image reading unit that assigns read signals of an image to plural output terminals and outputs the read signals; at least one high-speed serial transmitting unit that is connected to the plural output terminals; and an outputting unit that outputs a high-speed serial signal outside, the high-speed serial signal being transmitted from the high-speed serial transmitting unit, in which at least distances of interconnects from the plural output terminals to the high-speed serial transmitting unit are set to be equal.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiment(s) of the invention be described with reference to the drawings.

[First Embodiment]

Figure 1:
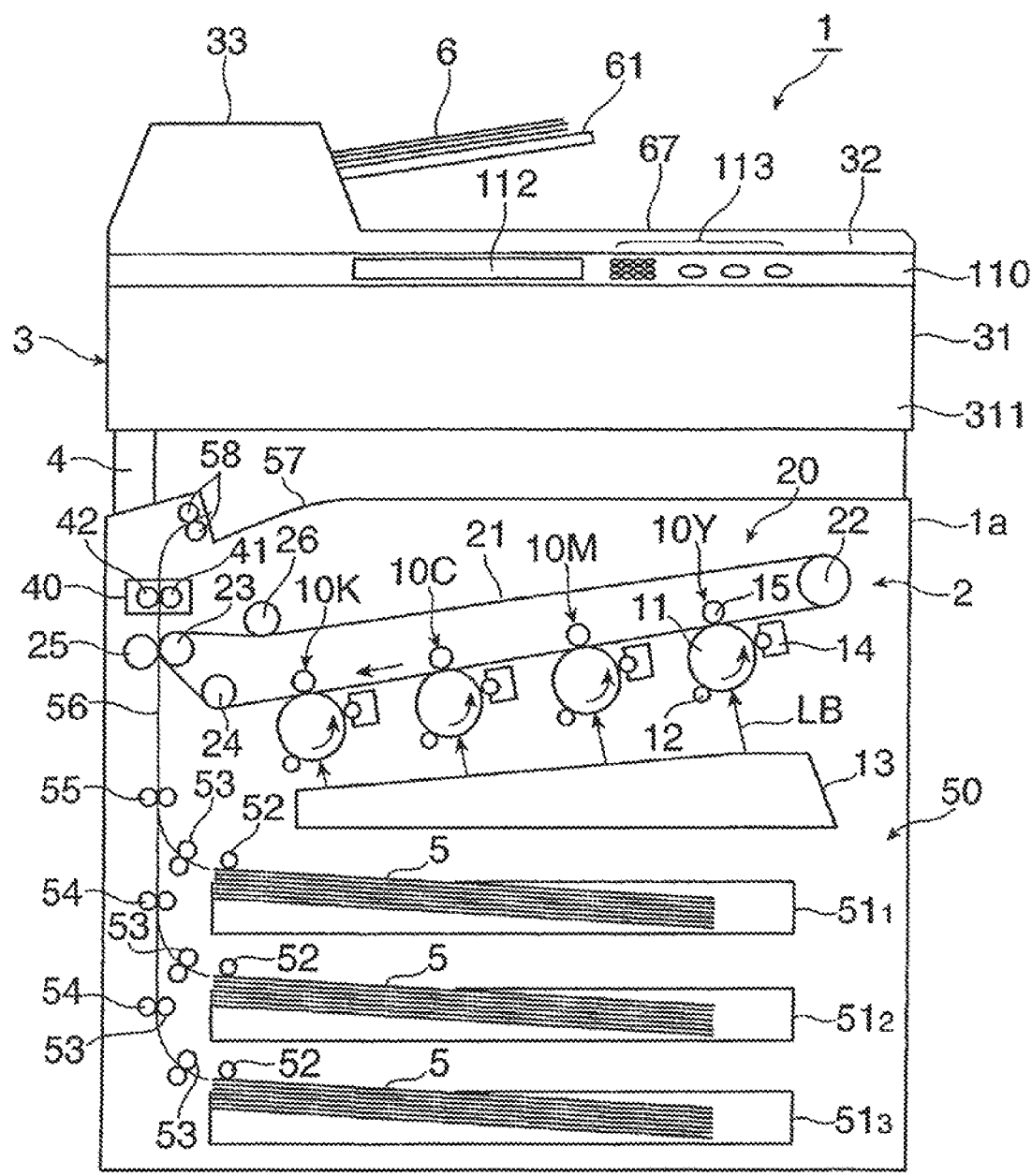
FIG. 1 is an entire configuration diagram illustrating an image forming apparatus to which an image reading device according to a first embodiment of the invention is applied.

FIG. 1 is a configuration diagram illustrating main portions of an entire image forming apparatus to which an image reading substrate and an image reading device according to a first embodiment of the invention are applied.

<Entire Configuration of Image Forming Apparatus>

An image forming apparatus 1 according to the first embodiment is configured as, for example, a color photocopier. The image forming apparatus 1 is provided with an image reading device 3 and an image forming unit 2. The image reading device 3 reads an image of a document 6. The image forming unit 2 is an example of an image forming unit for forming an image on a recording medium on the basis of image data. The image reading device 3 is arranged above an apparatus main body 1a while being supported by a supportive portion 4. The apparatus main body 1a accommodates the image forming unit 2. A space is formed between the image reading device 3 and the apparatus main body 1a so as to discharge a recording medium on which an image is formed.

A control panel 110 as an operating unit that operates the image forming apparatus 1 and the image reading device 3 is disposed in the upper portion of a front wall 311 that is positioned on the front face of a casing 31 of the image reading device 3 as illustrated in FIG. 1. The control panel 110 doubles as a display unit that displays an operations menu, warnings, messages, and the like to the user. The control panel 110 includes a touch panel 112 and plural operating buttons 113 that receive various settings and the like with respect to the operations menu displayed.

The image forming unit 2 is provided with plural imaging devices 10, an intermediate transfer device 20, a paper feeding device 50, a fixing device 40, and the like. The imaging devices 10 form toner images that are developed with toners which constitute developers. The intermediate transfer device 20 carries each toner image formed by each imaging device 10 and finally transports the toner images to a secondary transfer position where the toner images are secondarily transferred onto a recording paper 5 which is an example of a recording medium. The paper feeding device 50 accommodates and transports the necessary recording paper 5 that is to be supplied to the secondary transfer position of the intermediate transfer device 20. The fixing device 40 fixes the toner images which are secondarily transferred by the intermediate transfer device 20 onto the recording paper 5. The apparatus main body 1a is formed by a supportive structure member, an exterior cover, and the like.

The paper feeding device 50 is arranged to be positioned below a light exposing device 13. The paper feeding device 50 is mainly configured of plural (or single) paper accommodation bodies $51_1$ to $51_3$ and transporting devices 52 and 53. The paper accommodation bodies $51_1$ to $51_3$ accommodate a stack of recording papers 5 of a desired size, type, and the like. The delivery devices 52 and 53 deliver the recording papers 5 one at a time from the paper accommodation bodies $51_1$ to $51_3$. A paper accommodation body 51 is installed such that, for example, the paper accommodation body 51 can be drawn toward the front face of the apparatus main body 1a (a side face that a user faces when operating).

A paper feeding transport path 56 is disposed between the paper feeding device 50 and the intermediate transfer device 20. The paper feeding transport path 56 is configured of plural paper transport rolls 54 and 55 and a transport guide member that transport the recording paper 5 which is delivered from the paper feeding device 50 to the secondary transfer position. The paper transport roll 55 that is arranged at a position immediately before the secondary transfer position on the paper feeding transport path 56 is configured as, for example, a roll (resist roll) that adjusts a time of transport of the recording paper 5. A discharge roll 58 that discharges the recording paper 5 to a discharge accommodation unit 57 is arranged on the downstream side of the fixing device 40 along the direction of paper transport.

The plural imaging devices 10 are configured of four imaging devices 10Y, 10M, 10C, and 10K that dedicatedly and respectively form toner images in four colors of yellow (Y), magenta (M), cyan (C), and black (K). Each imaging device 10 (Y, M, C, and K) is provided with a photoreceptor drum 11, a charging device 12, the light exposing device 13, a developing device 14, a primary transfer device 15, an unillustrated drum cleaning device, and the like. The photoreceptor drum 11 rotates as an example of an image carrier. The charging device 12 charges a peripheral face (image carrying face) of the photoreceptor drum 11 where image can be formed with a necessary potential. The light exposing device 13 forms electrostatic latent images (for each color) having potential differences by irradiating the charged peripheral face of the photoreceptor drum 11 with light LB that is based on image information (signal). The developing device 14 changes the electrostatic latent images to toner images by developing the electrostatic latent images with corresponding color (Y, M, C, and K) developer toners. The primary transfer device 15 transfers each of the toner images to the intermediate transfer device 20. The drum cleaning device removes and cleans attached materials such as toners that are attached to the image carrying face of the photoreceptor drum 11 and remain after primary transfer.

The intermediate transfer device 20 includes an intermediate transfer belt 21 and plural transport rolls 22 to 24 and 26 that transport the intermediate transfer belt 21 along the direction of an arrow. A roll-shaped secondary transfer device 25 that secondarily transfers all of the toner images on the intermediate transfer belt 21 to the recording paper 5 is arranged in contact with the transport roll 23 through the intermediate transfer belt 21.

The fixing device 40 is provided with a heating rotating body 41 and a pressure applying rotating body 42. A contact portion between the heating rotating body 41 and the pressure applying rotating body 42 constitutes a fixing processing unit that fixes toner images onto the recording paper 5.

<Basic Operation of Image Forming Apparatus>

Hereinafter, a basic image forming operation performed by the image forming apparatus 1 will be described.

Here, an image forming operation that is performed when a full color image configured of a combination of four color (Y, M, C, and K) toner images is formed by using the four imaging devices 10 (Y, M, C, and K) will be described.

The four imaging devices 10 (Y, M, C, and K), the intermediate transfer device 20, the secondary transfer device 25, the fixing device 40, and the like start to operate when the image forming apparatus 1 receives instruction information about an image forming operation (print) request.

The four color (Y, M, C, and K) toner images, each of which is developed with the corresponding color toner, are visualized in each imaging device 10 (Y, M, C, and K). When each color toner image formed by each imaging device 10 (V, M, C, and K) is transported to a primary transfer position, the primary transfer device 15 primarily transfers each color toner image onto the intermediate transfer belt 21 of the intermediate transfer device 20, the intermediate transfer belt 21 rotating in the direction illustrated by the arrow, such that each color toner image is overlaid in order. Next, the intermediate transfer device 20 carries and transports the toner images, which are primarily transferred by the rotation of the intermediate transfer belt 21, to the secondary transfer position. The paper feeding device 50 delivers the necessary recording paper 5 to the paper feeding transport path 56 in accordance with an imaging operation. On the paper feeding transport path 56, the paper transport roll 55 as a resist roll delivers and supplies the recording paper 5 to the secondary transfer position at the time of transfer.

The secondary transfer device 25 secondarily transfers all of the toner images on the intermediate transfer belt 21 onto the recording paper 5 at the secondary transfer position. In the intermediate transfer device 20 after the secondary transfer ends, an unillustrated belt cleaning device removes and cleans attached materials such as toners that remain on the surface of the intermediate transfer belt 21 after the secondary transfer.

Next, the recording paper 5 on which the toner images are secondarily transferred is transported to the fixing device 40 after being separated from the intermediate transfer belt 21 and the secondary transfer device 25. The fixing device 40 fixes non-fixed toner images to the recording paper 5 by performing a necessary fixing process (heating and applying pressure). Finally, the recording paper 5 after the fixing ends is discharged by the discharge roll 58 to, for example, the discharge accommodation unit 57 that is arranged in the upper portion of the apparatus main body 1a.

According to the operation described herebefore, the recording paper 5 on which a full color image formed by combining four color toner images is formed is discharged.

<Configuration of Image Reading Device>

Figure 2:
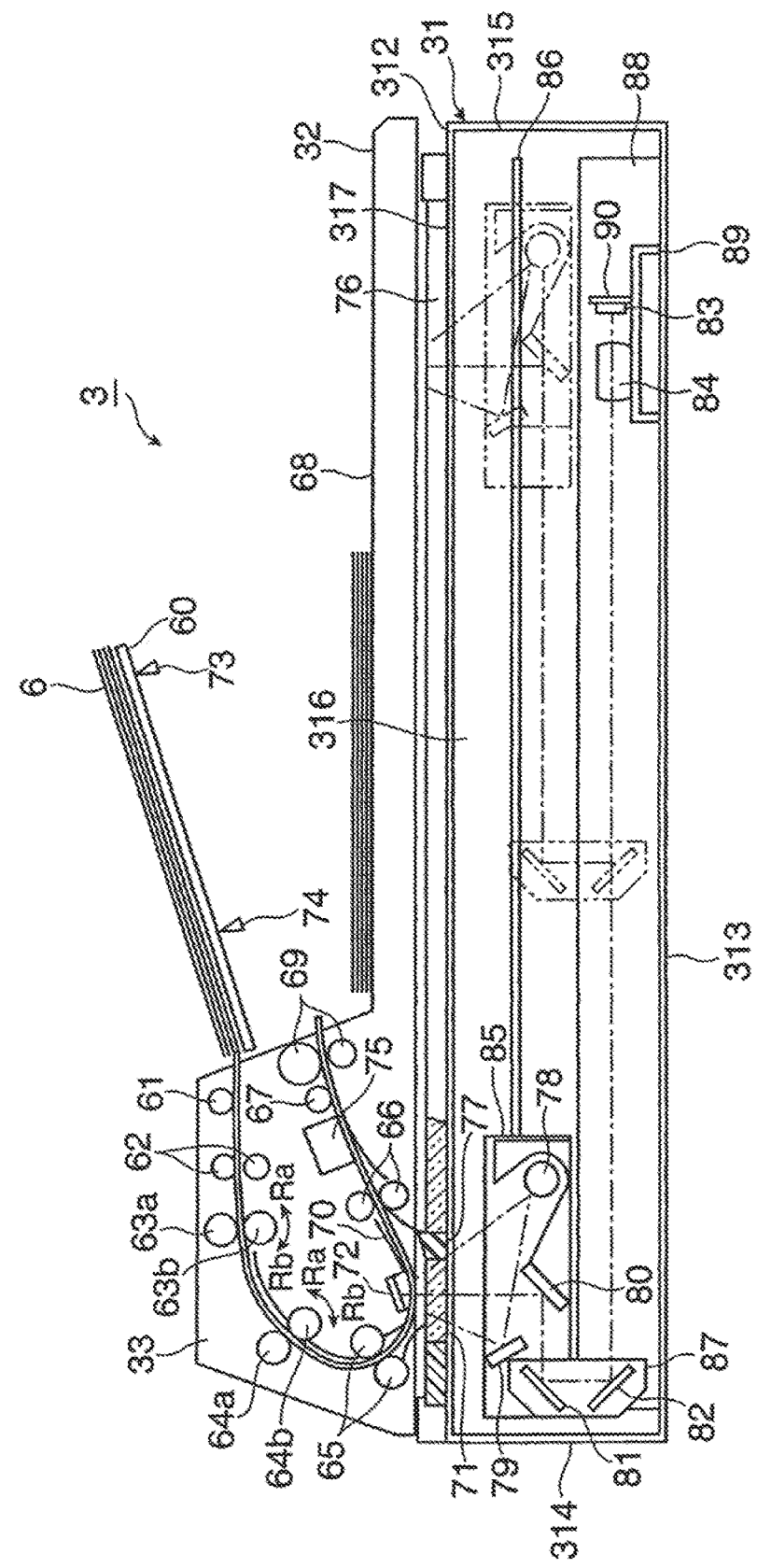
FIG. 2 is a sectional configuration diagram illustrating the image reading device according to the first embodiment of the invention.

FIG. 2 is a schematic configuration diagram illustrating a configuration of an image reading device to which the image reading substrate according to the first embodiment is applied.

The image reading device 3 is broadly divided into the casing 31, a document pressing cover 32, and an automatic document transporting device (duplex automatic document feeder; DADF) 33. The casing 31 has a document reading face that is formed on the upper end face thereof. The document pressing cover 32 is installed to be freely opened and closed with respect to the casing 31. The automatic document transporting device 33 is disposed in one end portion of the document pressing cover 32.

The image reading device 3 is configured to be switchable between a first reading mode and a second reading mode in response to an operation of a user. In the first reading mode, the image reading device 3 reads the document 6 while automatically transporting the document 6 one at a time with the automatic document transporting device 33. In the second reading mode, the image reading device 3 reads the document 6 that is placed on a below-described document table 76. FIG. 2 illustrates a state of each member when a document is read in the first reading mode.

The automatic document transporting device 33 includes a document transport mechanism that is configured of a document accommodation unit 60, a delivery roll 61, a separating roll 62, transport rolls 63 to 67, and a discharge roll 69. The document accommodation unit 60 accommodates a stack of the documents 6. The delivery roll 61 delivers the document 6 from the document accommodation unit 60. The separating roll 62 separates the document 6 which is delivered by the delivery roll 61 one at a time. The transport rolls 63 to 67 transport the document 6 to a document reading position. The discharge roll 69 discharges the document 6 to a discharge accommodation unit 68. The delivery roll 61, the separating roll 62, the transport rolls 63 to 67, and the discharge roll 69 are driven by a driving unit (not illustrated) when the document 6 is read. The transport roll 64 functions as a resist roll. The transport roll 63 that is positioned on the upstream side of the direction of transport performed by the transport roll 64 functions as a pre-resist roll. The transport roll 67 is a roll for pressing the upper face (rear face) of the document 6.

The transport roll 63 and the transport roll 64 that are arranged along the direction of transport of the document 6 function as a correcting unit for mechanically correcting inclination of the document 6 with respect to the direction of transport. A transport roll 63b of the transport roll 63 positioned on the upstream side of the direction of transport of the document 6, as a driving roll, is configured to be rotatable in a normal rotation direction Ra and in a reverse rotation direction Rb in FIG. 2 with a drive motor M (refer to FIG. 10) and the like as a driving unit as illustrated in FIG. 2. A transport roll 63a that is a driven roll rotates in response to the rotation of the transport roll 63b while being in pressed contact with the transport roll 63b. At this time, the direction of rotation of the transport roll 63b is opposite to the direction of rotation of the transport roll 63a.

Similarly, a transport roll 64b of the transport roll 64 positioned on the downstream side of the direction of transport of the document 6, as a driving roll, is configured to be rotatable in the normal rotation direction Ra and in the reverse rotation direction Rb in FIG. 2 with a drive motor (not illustrated) and the like as a driving unit. A transport roll 64a that is a driven roll rotates in response to the rotation of the transport roll 64b while being in pressed contact with the transport roll 64b. At this time, the direction of rotation of the transport roll 64b is opposite to the direction of rotation of the transport roll 64a.

The transport roll 63 constitutes a skew correcting unit that mechanically bends the document 6 by causing the tip end of the document 6 to abut the stopped transport roll 64 positioned on the downstream side and that corrects inclination of the transported document 6 with respect to the direction of transport (hereinafter, referred to as "skew correction"). Similarly, the transport roll 64 constitutes the same skew correcting unit that mechanically bends the document 6 by causing the tip end of the document 6 to abut the stopped transport roll 65 positioned on the downstream side and that performs skew correction on the transported document 6 with respect to the direction of transport. However, the transport rolls 63 and 64 are controlled by a control unit and perform skew correction mechanically only when necessary. Thus, the transport rolls 63 and 64 are usually rotationally driven in the normal rotation direction Ra. Skewing of the document 6 does not have to be corrected in two stages by using both of the transport rolls 63 and 64. Skew correction may be configured to be performed on the document 6 by using only one of the transport roll 63 and the transport roll 64.

The automatic document transporting device 33 includes a reading guide 70, a regular reflective plate 72, a first size detecting sensor 73, a second size detecting sensor 74, and a rear face reading unit 75. The reading guide 70 has a curved shape and guides the document 6 to the reading position and also guides the document 6 in the direction of discharge from the reading position. The regular reflective plate 72 has a shape of a plate and is disposed on the reading guide 70 above a reading window 71 to serve as a rear stopper for the document 6. The first size detecting sensor 73 detects the size of the document 6 in a sub-scan direction. The second size detecting sensor 74 also detects the size of the document 6 in the sub-scan direction. The rear face reading unit 75 reads an image of the rear face of the document 6 when necessary.

The casing 31 of the image reading device 3 is formed as a rectangular parallelepiped box body of which a part of the upper end face is opened. The casing 31 includes a top wall 312, a bottom wall 313; a side wall 314, a side wall 315, the above front wall 311 (refer to FIG. 1), and a rear wall 316. The top wall 312 faces the document pressing cover 32. The bottom wall 313 faces the top wall 312. The side wall 314 and the side wall 315 face each other in the sub-scanning direction (left-right direction in FIG. 2) through the bottom wall 313. The rear wall 316 faces the front wall 311 in a main-scanning direction (direction orthogonal to the page of FIG. 2).

An opening portion 317 is formed at a part of the top wall 312 of the casing 31 the part corresponding to the document reading position of the document 6 that is read in the second reading mode. A transparent document table 76 (platen glass) that supports the document 6 is arranged in the opening portion 317. A transparent reading window 71 is disposed on the automatic document transporting device 33 side of the document table 76 so as to read the document 6 in the first reading mode. A guide member 77 is disposed between the reading window 71 and the document table 76 so as to guide the document 6 in the first reading mode.

The image reading device 3 is provided with an image reading unit in the casing 31 that includes a light source 78, a reflector 79, a first mirror 80, a second mirror 81, a third mirror 82, an image forming lens 84, and the like. The light source 78 is an example of an illuminating unit that is configured of an illumination lamp, a light emitting diode (LED), and the like which perform irradiation with light so as to illuminate the document 6. The reflector 79 reflects part of light emitted from the light source 78 in a direction toward the document 6. The first mirror 80 receives reflective light from the document 6. The second mirror 81 receives reflective light from the first mirror 80. The third mirror 82 receives reflective light from the second mirror 81. The image forming lens 84 causes reflective light from the third mirror 82 to be formed into an image in an image reading element 83 that is an example of an image reading unit configured of a charge-coupled device (CCD) and the like. The light source 78, the reflector 79, and the first to the third mirrors 80 to 82 are arranged along the sub-scanning direction (left-right direction in FIG. 2). The light source 78 emits light in a direction toward the document 6, the regular reflective plate 72, and the reflector 79. The first to the third mirrors 80 to 82 and the image forming lens 84 constitute an optical system so as to read an image of the document 6 with the image reading element 83.

The light source 78, the reflector 79, and the first mirror 80 are arranged in the main-scanning direction and are fixed to a first moving body 85 that is configured of a carriage which is disposed to be movable by a driving unit along the sub-scanning direction. The first moving body 85 is guided by a first rail 86 that is arranged along the sub-scanning direction in the rear wall 316 of the casing 31, illuminates a reading target region of the document 6 while moving in the sub-scanning direction, and reflects reflective light from the document 6 with the first mirror 80 toward the second mirror 81 of a second moving body 87.

The second mirror 81 and the third mirror 82 are arranged in the main-scanning direction and are fixed to the second moving body 87 that is configured of a carriage which is disposed to be movable by a driving unit along the sub-scanning direction. The second moving body 87 is guided by a second rail 88 that is arranged along the sub-scanning direction in the bottom wall 313 of the casing 31 and reflects reflective light from the document 6 toward the image forming lens 84 of the image reading unit while moving in the sub-scanning direction. The number of each of the first rail 86 and the second rail 88 arranged is one, and the first rail 86 and the second rail 88 face both end portions that are positioned along the main-scanning direction.

The image reading unit includes an image reading substrate 90 of the first embodiment. The image reading substrate 90 is fixed to a base plate 89 that is supported by the bottom wall 313. The image forming lens 84 and the image reading element 83 are mounted on the image reading substrate 90. The image reading unit is configured to cause reflective light from the third mirror 82 to pass through the image forming lens 84 and to be formed into an image in the image reading element 83 which is configured of a CCD and the like. The image reading unit is also configured to read an image of the document 6 with the image reading element 83 and to output image data.

In the first reading mode, as illustrated by a sold line in FIG. 2, while the first moving body 85 is stopped at the reading position that is set to the left end portion of the casing 31, the document 6 is automatically transported by the automatic document transporting device 33. The image of the document 6 that passes through the reading window 71 is illuminated by the light source 78, and reflective light from the document 6 is reflected by the first mirror 80 toward the image forming lens 84 through the second and the third mirrors 81 and 82. The image reading unit, with the image forming lens 84, causes reflective light from the third mirror 82 to be formed into an image in the image reading element 83 which is configured of a CCD and the like. The image reading unit, as described below, outputs image data that is obtained by reading the image of the document 6 with the image reading element 83.

Meanwhile, in the second reading mode, the first moving body 85 and the second moving body 87 are driven by an unillustrated driving mechanism. The amount of movement of the second moving body 87 is configured to be half the amount of movement of the first moving body 85 so that, the optical path length from the image reading part of the document 6 to the image reading element 83 does not change during the movement of the first moving body 85 in the sub-scanning direction. The double-dot chain line in FIG. 2 illustrates the positions of the first moving body 85 and the second moving body 87 when the first moving body 85 moves to the vicinity of the end portion in the sub-scanning direction of the document 6.

<Configuration of Main Portions of Image Reading Device>

Figure 3:
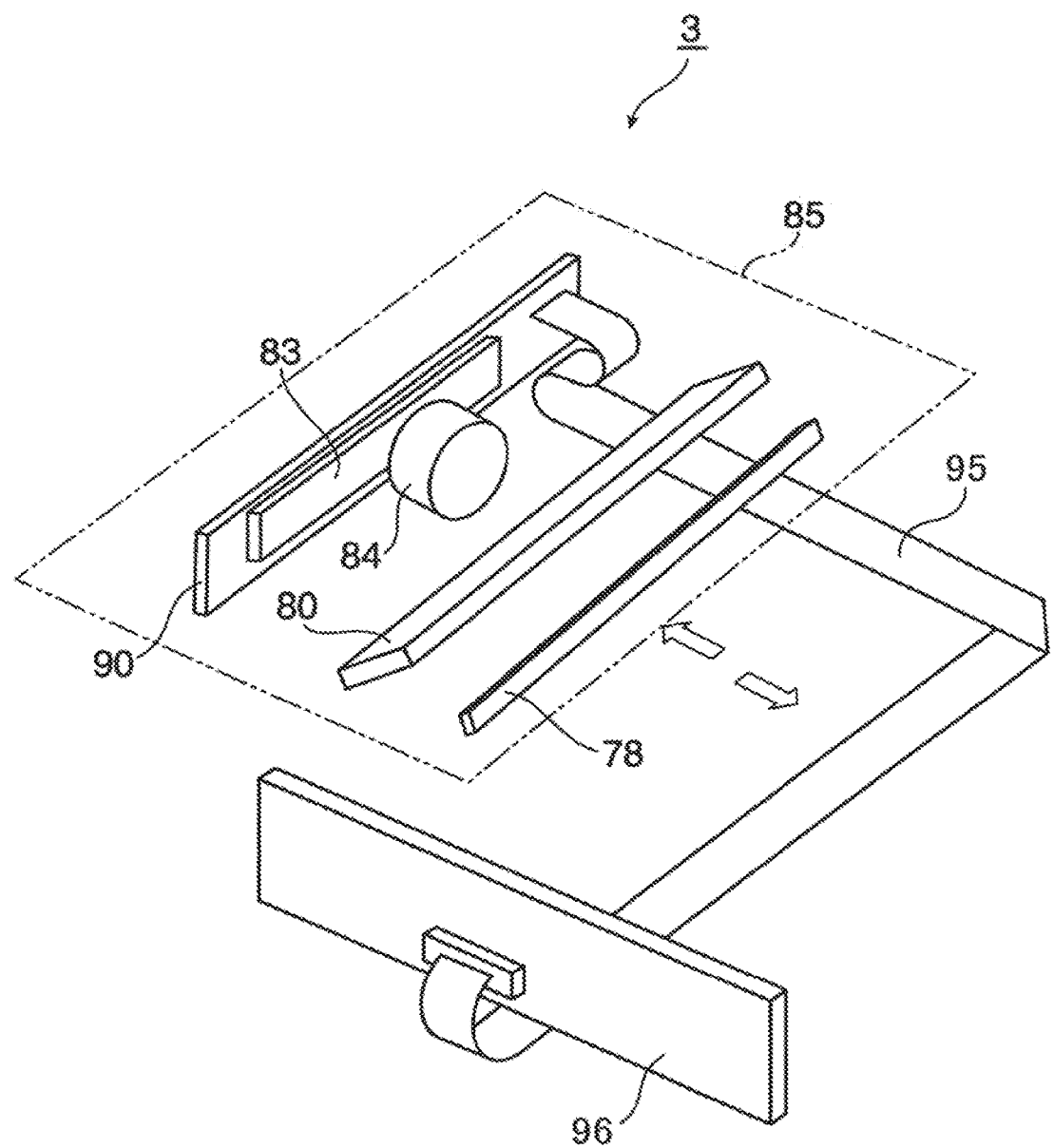
FIG. 3 is a perspective configuration diagram illustrating main portions of the image reading device.
Figure 4:
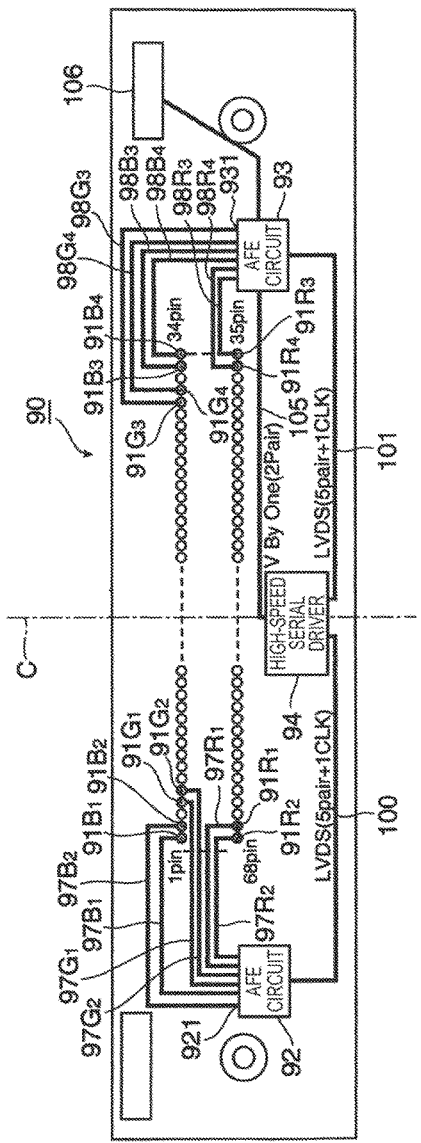
FIG. 4 is a configuration diagram illustrating an image reading substrate according to the first embodiment of the invention.

The image reading device 3 according to the first embodiment, as illustrated in FIG. 3 and FIG. 4, is provided with the image reading substrate 90 on which the image reading element 83 is mounted. The image reading substrate 90 is configured of, for example, a printed interconnect substrate on which necessary interconnects are patterned. The image reading element 83 is configured of a CCD image sensor as an example of a line sensor. The image reading substrate 90 includes the image reading element 83, analog front end (hereinafter, shortly referred to as "AFE") circuits 92 and 93, and at least one high-speed serial driver 94. The image reading element 83 outputs read signals from plural output terminals $91_1$ to $91_4$ that are assigned in both end portions along the direction of arrangement of reading elements. The AFE circuits 92 and 93, as plural signal adjusting units for adjusting read signals, are respectively arranged in both end portions along the longitudinal direction of the image reading substrate 90 in correspondence with the plural output terminals $91_1$ to $91_4$ of the image reading element 83. The high-speed serial driver 94 is an example of a high-speed serial transmitting unit, and each of the AFE circuits 92 and 93 is connected to the high-speed serial driver 94. The image reading substrate 90, as illustrated in FIG. 3, is connected to a control substrate 96 through a first cable 95 for which a flexible flat cable (FFC) and the like are used. The control substrate 96 is disposed in either the casing 31 of the image reading device 3 or the apparatus main body 1a of the image forming apparatus 1. FIG. 4 illustrates a face of the image reading substrate 90 when the image reading substrate 90 is viewed on the opposite side from the side on which the image reading element 83 is mounted.

Figure 5:
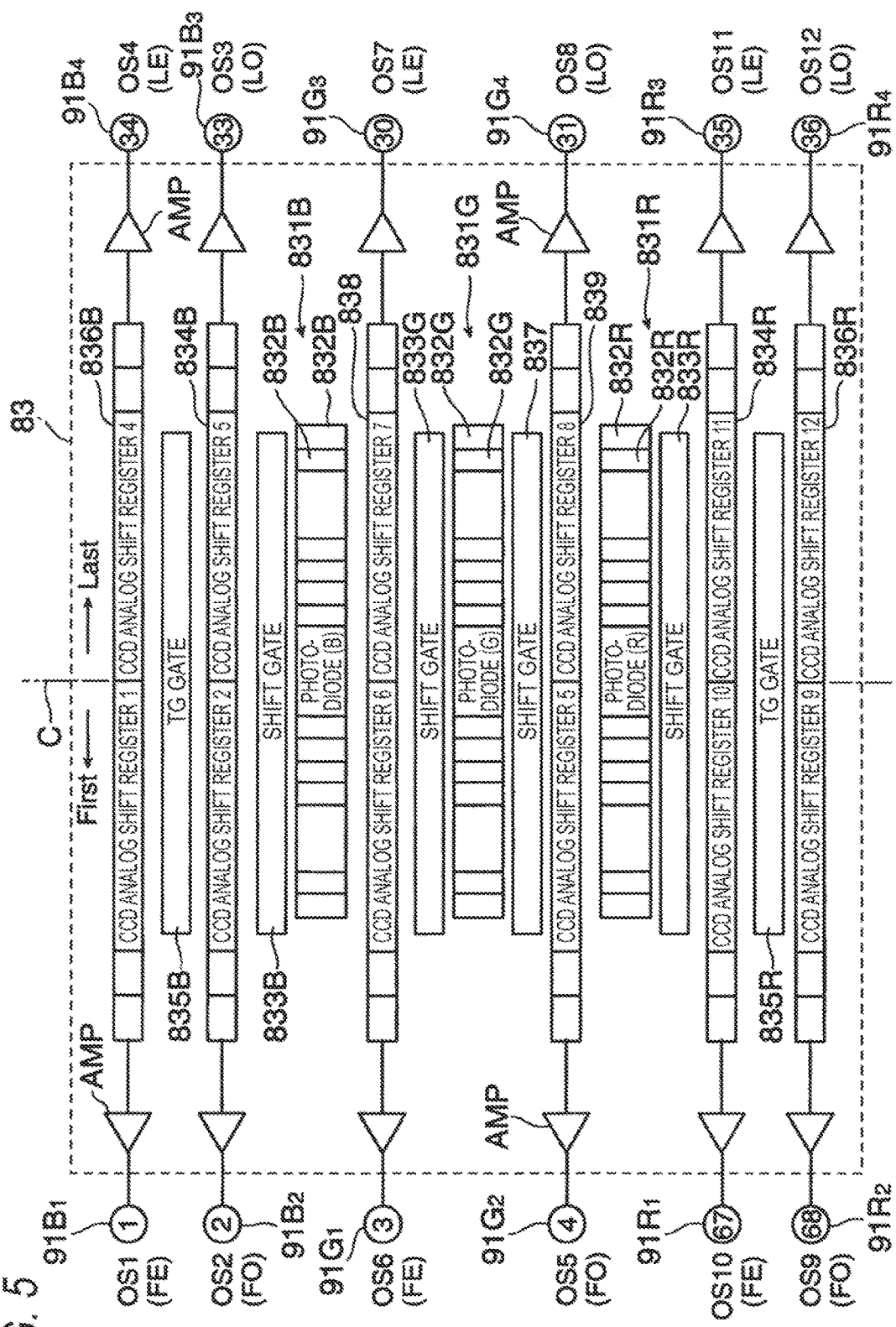
FIG. 5 is a configuration diagram illustrating an image reading element.

The image reading element 83, as illustrated in FIG. 5, is provided with three photoelectric conversion units 831R, 831G, and 831B, that correspond to three colors of red (R), green (G), and blue (B). In order to increase the speed of an image reading operation, the image reading element 83 has a configuration in which the red (R), the green (G), and the blue (B) photoelectric conversion units 831R, 831G, and 831B are divided into a head (First) side and a tail (Last) side from a center C along the direction of arrangement of the reading elements and in which, furthermore, plural reading elements that are positioned on the head side and on the tail side of the photoelectric conversion units 831R, 831G, and 831B are divided into even-numbered pixels and odd-numbered pixels to output read signals. In correspondence with this configuration, the image reading element 83 includes a first output terminal $91R_1$, a second output terminal $91R_2$, a third output terminal $91R_3$, and a fourth output terminal $91R_4$. The first output terminal $91R_1$ outputs an image signal (FE) from even-numbered (Even) pixels among the pixels positioned on the head (First) side of the red (R) photoelectric conversion unit 831R, and the second output terminal $91R_2$ outputs an image signal (FO) from odd-numbered (Odd) pixels among the pixels positioned on the head (First) side of the red (R) photoelectric conversion unit 831R. The third output terminal $91R_3$ outputs an image signal (LE) from even-numbered (Even) pixels among the pixels positioned on the tail (Last) side of the red (R) photoelectric conversion unit 831R, and the fourth output terminal $91R_4$ outputs an image signal (LO) from odd-numbered (Odd) pixels among the pixels positioned on the tail (Last) side of the red (R) photoelectric conversion unit 831R.

Similarly, the image reading element 83 includes a first output terminal 91G$_1$, a second output terminal 91G$_2$, a third output terminal 91G$_3$, and a fourth output terminal 91G$_4$. The first output terminal 91G$_1$ outputs the image signal (FE) from even-numbered (Even) pixels among the pixels positioned on the head (First) side of the green (G) photoelectric conversion unit 831G, and the second output terminal 91G$_2$ outputs the image signal (FO) from odd-numbered (Odd) pixels among the pixels positioned on the head (First) side of the green (G) photoelectric conversion unit 831G. The third output terminal 91G$_3$ outputs the image signal (LE) from even-numbered (Even) pixels among the pixels positioned on the tail (Last) side of the green (G) photoelectric conversion unit 831G, and the fourth output terminal 91G$_4$ outputs the image signal (LO) from odd-numbered (Odd) pixels among the pixels positioned on the tail (Last) side of the green (G) photoelectric conversion unit 831G.

The image reading element 83 includes a first output terminal 91B$_1$, a second output terminal 91B$_2$, a third output terminal 91B$_3$, and a fourth output terminal 91B$_4$. The first output terminal 91B$_1$ outputs the image signal (FE) from even-numbered (Even) pixels among the pixels positioned on the head (First) side of the blue (B) photoelectric conversion unit 831B, and the second output terminal 91B$_2$ outputs the image signal (FO) from odd-numbered (Odd) pixels among the pixels positioned on the head (First) side of the blue (B) photoelectric conversion unit 831B. The third output terminal 91B$_3$ outputs the image signal (LO) from odd-numbered (Odd) pixels among the pixels positioned on the tail (Last) side of the blue (B) photoelectric conversion unit 831B, and the fourth output terminal 91B$_4$ outputs the image signal (LE) from even-numbered (Even) pixels among the pixels positioned on the tail (Last) side of the blue (B) photoelectric conversion unit 831B.

In FIG. 5, numbers attached in circle marks that illustrate the output terminal 91 illustrate numbers that are attached to electrodes of the image reading element 83 that is configured of semiconductor elements. For example, the number that is attached to the first output terminal 91B$_1$ of the blue (B) photoelectric conversion unit 831B is "1", and this indicates that the first output terminal 91B$_1$ is a first electrode of the image reading element 83.

The red (R) photoelectric conversion unit 831R and the blue (B) photoelectric conversion unit 831B that are positioned in both end portions along the direction intersecting the direction of arrangement of the image reading element 83 have different configurations for outputting read signals from the first to the fourth output terminals 91$_1$ to 91$_4$ from the green (G) photoelectric conversion unit 831G that is positioned in the central portion.

The red (R) and the blue (B) photoelectric conversion units 831R and 831B are provided with plural photodiodes 832R, 832B, . . . , CCD analog shift registers 834R and 834B, and CCD analog shift registers 836R and 836B. The photodiodes 832R, 832B, . . . are an example of a photoelectric conversion element and are arranged in a straight line. The CCD analog shift registers 834R and 834B are arranged beside the photodiodes 832R, 832B, . . . through shift gates 833R and 833B. The CCD analog shift registers 836R and 836B are arranged beside the CCD analog shift registers 834R and 834B through transfer gates 835R and 835B.

The CCD analog shift registers 834R and 834B and the CCD analog shift registers 836R and 836B are divided into a head (First) side and a tail (Last) side in correspondence with the pixels of the photoelectric conversion unit 831B. The parts of the CCD analog shift registers 834R and 834B that are positioned on the head (First) side are connected to the first and the second output terminals 91$_1$ and 91$_2$ through amplifiers AMP. The part of the CCD analog shift register 834 that is positioned on the tail (Last) side is connected to the third and the fourth output terminals 91$_3$ and 91$_4$ through amplifiers AMP.

The green (G) photoelectric conversion unit 831G includes plural photodiodes 832G, 832G, . . . and CCD analog shift registers 838 and 839. The photodiodes 832G, 832G, . . . are an example of the photoelectric conversion element and are arranged in a straight line. The CCD analog shift registers 838 and 839 are arranged on both sides of the photodiodes 832G, 832G, respectively through shift gates 833G and 837.

The CCD analog shift registers 838 and 839 are divided into a head (First) side and a tail (Last) side in correspondence with the pixels of the photoelectric conversion unit 831G. The parts of the CCD analog shift registers 838 and 839 that are positioned on the head (First) side are connected to the first and the second output terminals 91$_1$ and 91$_2$ through amplifiers AMP. The parts of the CCD analog shift registers 838 and 839 that are positioned on the tail (Last) side are connected to the third and the fourth output terminals 91$_3$ and 91$_4$ through amplifiers AMP.

The photodiodes 832R, 832G, and 832B of the red (R), the green (G), and the blue (B) photoelectric conversion units are respectively covered by unillustrated red (G), green (G), and blue (B) filters.

The six output terminals 91R$_1$, 91R$_2$, 91G$_1$, 91G$_2$, 91B$_1$, and 91B$_2$ that are arranged on the head (First) side of the image reading element 83 are connected to the first AFE circuit 92 through interconnect patterns 97R$_1$, 97R$_2$, 97G$_1$, 97G$_2$, 97B$_1$, and 97B$_2$ as illustrated in FIG. 4. The first AFE circuit 92 includes six input terminals 921 in the upper end portion thereof.

The six output terminals 91R$_3$, 91R$_4$, 91G$_3$, 91G$_4$, 91B$_3$, and 91B$_4$ that are arranged on the tail (Last) side of the image reading element 83 are connected to the second AFE circuit 93 through interconnect patterns 98R$_3$, 98R$_4$, 98G$_3$, 98G$_4$, 98B$_3$, and 98B$_4$. The second AFE circuit 93 is configured in the same manner as the first AFE circuit 92 and includes six input terminals 931 in the upper end portion thereof.

The interconnect patterns 97 and 98 that connect the output terminal 91 of the image reading element 83 to the first and the second AFE circuits 92 and 93 are patterned in advance on the printed interconnect substrate that constitutes the image reading substrate 90. At this time, the interconnect patterns 97 and 98 that connect the output terminal of the image reading element 83 to the first and the second analog front end (AFE) circuits 92 and 93 are paths on which analog signals are transmitted. The distances of the interconnect patterns 97 and 98 are desirably set to be as short as possible. The lengths of interconnects on the first AFE circuit 92 and on the second AFE circuit 93 may be the same. That is, the distance of the interconnect between the output terminal of the image reading element 83 and the first AFE circuit 92 and the distance of the interconnect between the output terminal of the image reading element 83 and the second AFE circuit 93 may be configured to be equal for each color.

Figure 6:
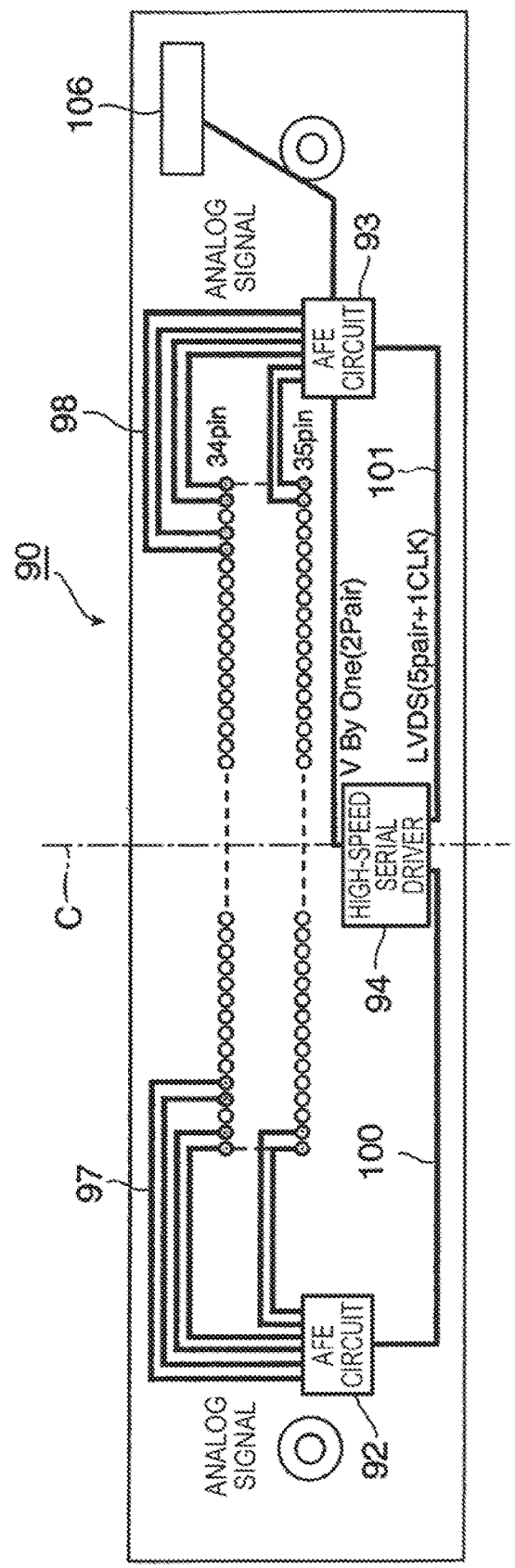
FIG. 6 is a configuration diagram illustrating another example of an interconnect pattern of the image reading substrate.

As a unit for configuring the distance of the interconnect between the output terminal of the image reading element 83 and the first AFE circuit 92 and the distance of the interconnect between the output terminal of the image reading element 83 and the second AFE circuit 93 to be equal for each color, for example, the interconnect patterns 97 and 98 may be arranged in left-right symmetry with respect to the center (center line) C of the image reading element 83 as illustrated in FIG. 6. Here, a left-right direction means a direction along the longitudinal direction, which is the direction of arrangement of the image reading element 83.

The first and the second AFE circuits 92 and 93 are configured of a semiconductor element that includes an amplifier, a filter circuit, an A/D converter, and a low voltage differential signaling (LVDS) transmitter and the like. The amplifier amplifies read signals that are configured of analog signals output from the output terminal of the image reading element 83. The filter circuit removes noise from the read signals. The A/D converter performs analog/digital conversion on the read signals. In LVDS, a high data transmission speed such as a few hundred Mbps to a few Gbps is obtained.

The first and the second AFE circuits 92 and 93 are connected to the high-speed serial driver 94, which is an example of the high-speed serial transmitting unit, through interconnect patterns 100 and 101. The interconnect patterns 100 and 101 include a five-pair signal line and a one-pair clock line. The high-speed serial driver 94 outputs read signals that are configured of digital signals output from the first and the second AFE circuits 92 and 93 as a serial high-speed transmission signal using V-By-One.

The interconnect pattern 100 that connects the first AFE circuit 92 to the high-speed serial driver 94 and the interconnect pattern 101 that connects the second AFE circuit 93 to the high-speed serial driver 94 are disposed to have the same length. That is, the distances of the interconnects are disposed to be equal.

To describe further, the interconnect patterns 100 and 101 are disposed such that the distances of the interconnects are equidistant by arranging the first and the second AFE circuits 92 and 93 in left-right symmetry with respect to the center C of the image reading element 83 and by arranging the high-speed serial driver 94 at the center C along the direction of arrangement of the image reading element 83.

The first and the second AFE circuits 92 and 93 and the high-speed serial driver 94, when it is difficult to arrange the first and the second AFE circuits 92 and 93 in accurate left-right symmetry with respect to the image reading element 83 or to arrange the high-speed serial driver 94 accurately at the center of the image reading element 83 in terms of a positional relationship between the plural input terminals and the plural output terminals, are arranged in approximate left-right symmetry and at an approximate center and are set to have the same length of signal lines with consideration of the positional relationship between the plural input terminals and the plural output terminals if the equal distances are obtained by detouring the interconnects.

Figure 7:
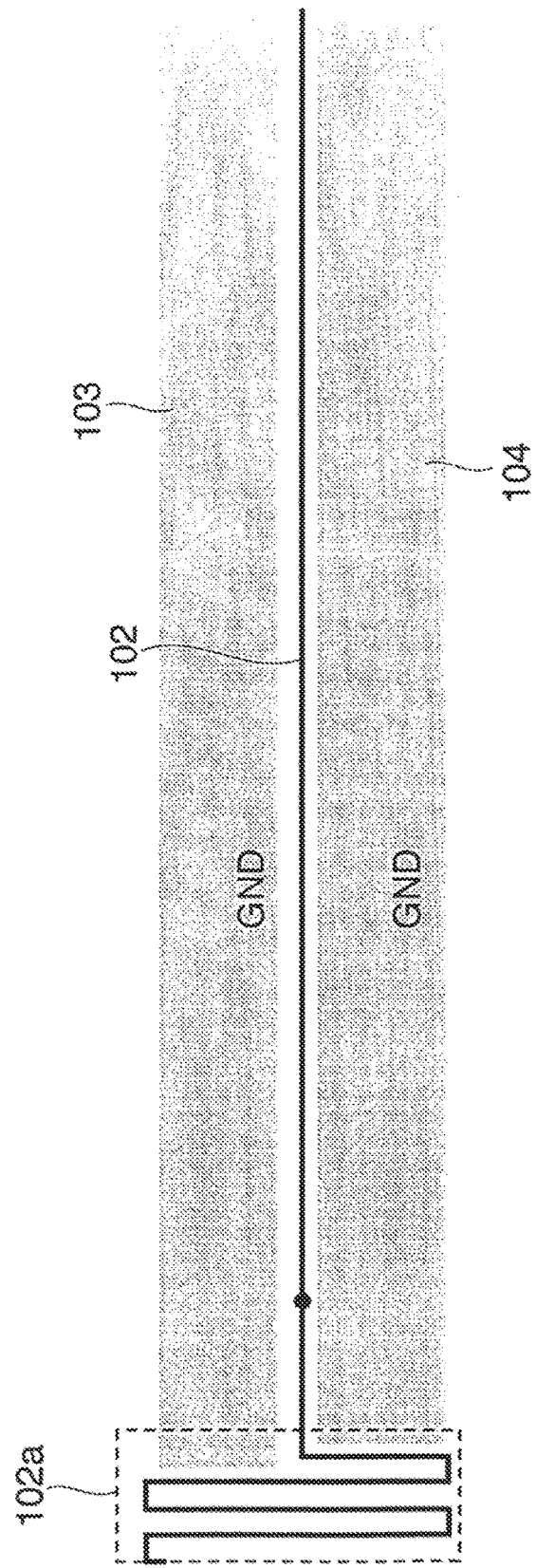
FIG. 7 is a configuration diagram illustrating a meander interconnect.

When it is difficult to arrange the first and the second AFE circuits 92 and 93 in left-right symmetry with respect to the image reading element 83 in terms of the layout of the image reading substrate 90 and when the equal distances are not provided by detouring the interconnects, the distances of the interconnects can be made equal by disposing a so-called meander interconnect part 102a on the interconnect patterns 100 and 101 that connect the first and the second AFE circuits 92 and 93 to the high-speed serial driver 94 as illustrated in FIG. 7. The meander interconnect part 102a adjusts the length of the signal line by, for example, curving an interconnect 102 into a crank shape or into a curved shape. In FIG. 7, the length of the interconnect 102 from the circle mark to the right end is set to be equal to the length of the interconnect 102 from the circle mark to the left end.

Noise can be reduced by arranging ground electrodes 103 and 104 on one side or both sides of an interconnect. However, when a meander interconnect is used, it is difficult to arrange ground electrodes on both sides of the interconnect. Therefore, in the present embodiment, distances are adjusted not by using meander interconnects but by using approximately straight interconnects as illustrated in FIG. 4 and FIG. 6. By devising such an arrangement, distances are adjusted without using meander interconnects. As illustrated in FIG. 7, the effect of reducing noise can also be obtained by removing the meander part 102a and arranging the ground electrodes 103 and 104 on one side or both sides of the interconnect.

The high-speed serial driver 94, as described above, transmits the read signals of the image reading element 83 as a high-speed serial signal by using, for example, V-By-One. A high-speed serial driver manufactured by THine Electronics can be used as the high-speed serial driver 94. The high-speed serial driver 94 is connected to a connector 106 through a two-pair signal line 105 that uses V-By-One. The connector 106 is an example of an outputting unit and is arranged in one end portion of the image reading substrate 90 along the longitudinal direction thereof. By using, for example, a parallel cable as the two-pair signal line 105 that connects the high-speed serial driver 94 to the connector 106, the distances of the signal lines that connect the high-speed serial driver 94 to the connector 106 are equally configured. The signal line 105 that connects the high-speed serial driver 94 to the connector 106 may be configured of a printed interconnect. The connector 106, as illustrated in FIG. 3, is connected to the control substrate 96 through the first cable 95. An unillustrated high-speed serial receiver that uses V-By-One is disposed in the control substrate 96.

A high-speed serial read signal that is output from the two-pair signal line 105 of the high-speed serial driver 94 is configured of signals on the head side of the image reading element 83 and RGB signals on the tail side thereof. The signals on the head side and the signals on the tail side of the image reading element 83 are combined by a circuit on the control substrate 96 side.

<Action of Main Portions of Image Reading Device>

In the image reading device 3 according to the first embodiment, the image data of the document 6 that is read by the image reading element 83 mounted on the image reading substrate 90 is output as a high-speed serial signal from the connector 106 of the image reading substrate 90 as follows.

In the image reading device 3, as illustrated in FIG. 2, in the first and the second reading modes, the document 6 is illuminated by the light source 78, and reflective light from the document 6 is formed into an image in the image reading element 83 through the first to the third mirrors 80 to 82 and the image forming lens 84.

The image reading element 83, as illustrated in FIG. 5, converts the image of the document 6 into electrical signals for three colors with the red (R), the green (G), and the blue (B) photoelectric conversion units 831R, 831G, and 831B. Read signals that are converted into electrical signals by the red (R), the green (G), and the blue (B) photoelectric conversion units 831R, 831G, and 831B are output from four of the first to the fourth output terminals $91_1$ to $91_4$ that are assigned for each of the photoelectric conversion units 831R, 831G, and 831B in correspondence with the pixels on the head side and the tail side of the image reading element 83 and the even-numbered and odd-numbered pixels.

Read signals that are output from the first and the second output terminals $91_1$ and $91_2$ among the first to the fourth output terminals $91_1$ to $91_4$ on the head side are input into the first AFE circuit 92 through the interconnect pattern 97 as illustrated in FIG. 4. The first AFE circuit 92, after amplifying the read signals that correspond to each color, removes noise and converts the read signals into digital signals. The first AFE circuit 92 outputs the read signals, which are converted into digital signals, to the high-speed serial driver 94 through the signal line 100.

Read signals that are output from the third and the fourth output terminals $91_3$ and $91_4$ among the first to the fourth output terminals $91_1$ to $91_4$ on the tail side are input into the second AFE circuit 93 through the interconnect pattern 98. The second AFE circuit 93, after amplifying the read signals that correspond to each color, removes noise and converts the read signals into digital signals. The second AFE circuit 93 outputs the read signals, which are converted into digital signals, to the high-speed serial driver 94 through the signal line 101.

The high-speed serial driver 94, when RGB read signals configured of the digital signals on the head side and the tail side of the image reading element 83 are input from the first and the second AFE circuits 92 and 93, individually converts the read signals on the head side and the read signals on the tail side of the image reading element 83 into V-By-One high-speed serial transmission signals according to a predetermined rule and outputs the high-speed serial transmission signals to the connector 106 through the two-pair signal line 105.

As such, in the image reading device 3 according to the first embodiment, as illustrated in FIG. 4, the distances of the interconnects of the interconnect patterns 100 and 101 from the first and the second AFE circuits 92 and 93 to the high-speed serial driver 94 are set to be equal. Thus, the time taken for the read signals output from the head side of the image reading element 83 and for the read signals output from the tail side of the image reading element 83 to be converted into high-speed transmission signals by the high-speed serial driver 94 and to reach the connector 106 can be equal, and the occurrence of jitter in the read signals output from the image reading element 83 is suppressed.

The occurrence of jitter in the read signals output from the image reading element 83 is further suppressed by setting the distances of the interconnects from the first and the second output terminals of the image reading element 83 to the first AFE circuit 92 to be equal to the distances of the interconnects from the third and the fourth output terminals of the image reading element 83 to the second AFE circuit 93.

The speed of propagation of read signals that are propagated through the interconnect patterns 100 and 101 from the first and the second AFE circuits 92 and 93 to the high-speed serial driver 94 is close to the speed of light. The speed of propagation of signals that are propagated through the interconnect patterns 100 and 101 from the first and the second AFE circuits 92 and 93 to the high-speed serial driver 94 is a few hundred Mbps to a few Gbps. The speed of propagation of the high-speed serial signals that are output from the high-speed serial driver 94 reaches 3.85 Gbps.

Thus, the occurrence of jitter in the read signals output from the image reading element 83 is suppressed by setting the distances of the interconnects of the interconnect patterns 100 and 101 from the first and the second AFE circuits 92 and 93 to the high-speed serial driver 94 to be equal.

[Second Embodiment]

Figure 8:
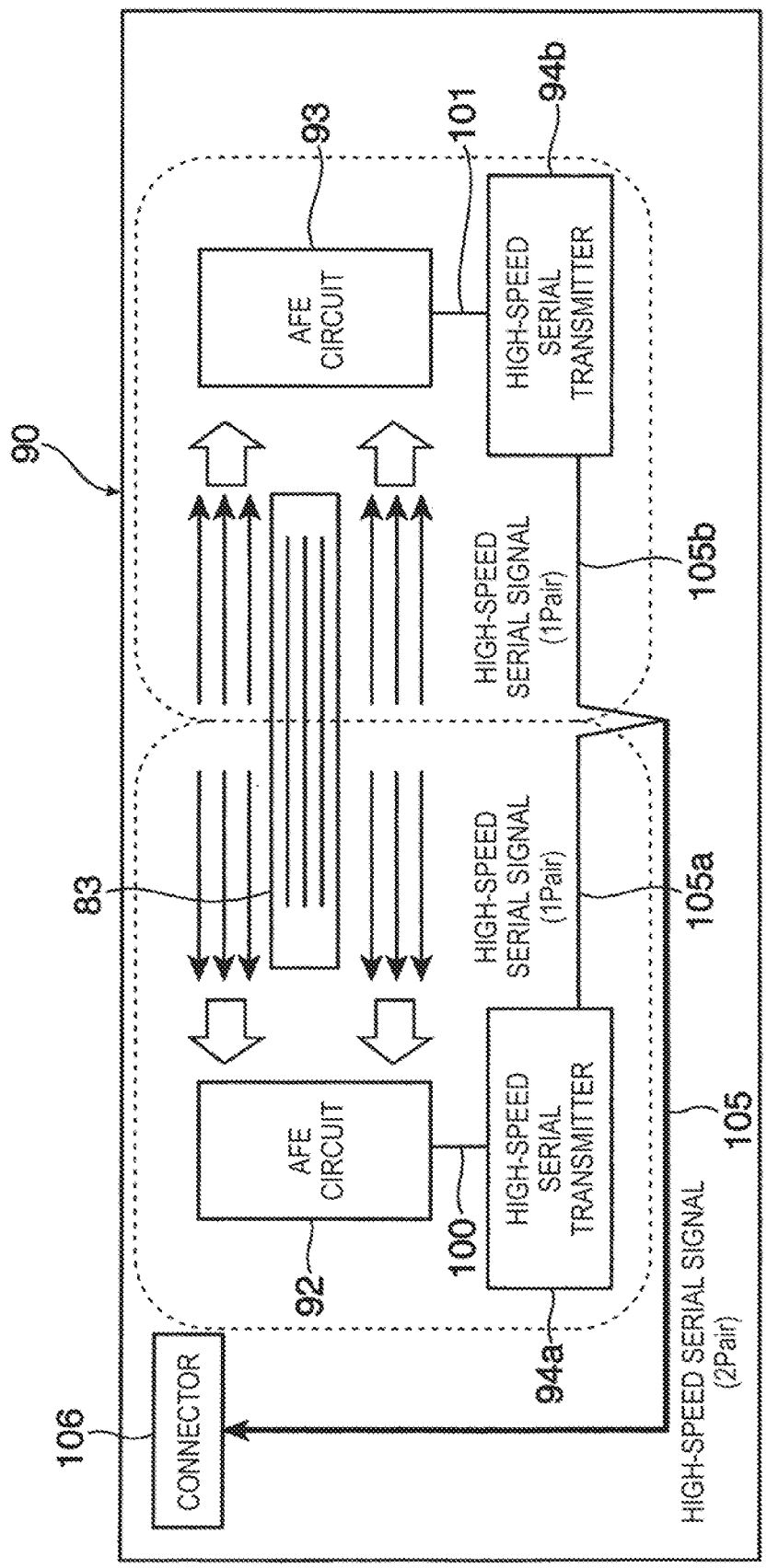
FIG. 8 is a schematic configuration diagram illustrating the image reading substrate according to a second embodiment of the invention.

FIG. 8 is a configuration diagram illustrating an image reading substrate according to a second embodiment of the invention.

The second embodiment is provided with first and second high-speed serial transmitters (drivers) 94a and 94b in correspondence with the first and the second AFE circuits 92 and 93 as illustrated in FIG. 8. The first high-speed serial transmitter 94a is connected to the first AFE circuit 92, and the second high-speed serial transmitter 94b is connected to the second AFE circuit 93.

In the second embodiment, a signal line 105a from the first high-speed serial transmitter 94a and a signal line 105b from the second high-speed serial transmitter 94b extend to a position that corresponds to the center of the image reading element 83 and are connected to the connector 106 after being bundled into one signal line 105 at the center of the image reading element 83. Thus, the distance of the interconnect from the first high-speed serial transmitter 94a to the connector 106 and the distance of the interconnect from the second high-speed serial transmitter 94b to the connector 106 are set to be equal.

The first and the second AFE circuits 92 and 93 and the first and the second high-speed serial drivers 94a and 94b are connected by short LVDS signal lines (five pair+one-pair clock) 100 and 101.

As such, in the second embodiment, the LVDS signal lines 100 and 101 that connect the first and the second AFE circuits 92 and 93 to the first and the second high-speed serial drivers 94a and 94b are significantly shortened. Thus, the speed of read signals output from the image reading element 83 is further increased.

[Third Embodiment]

Figure 9:
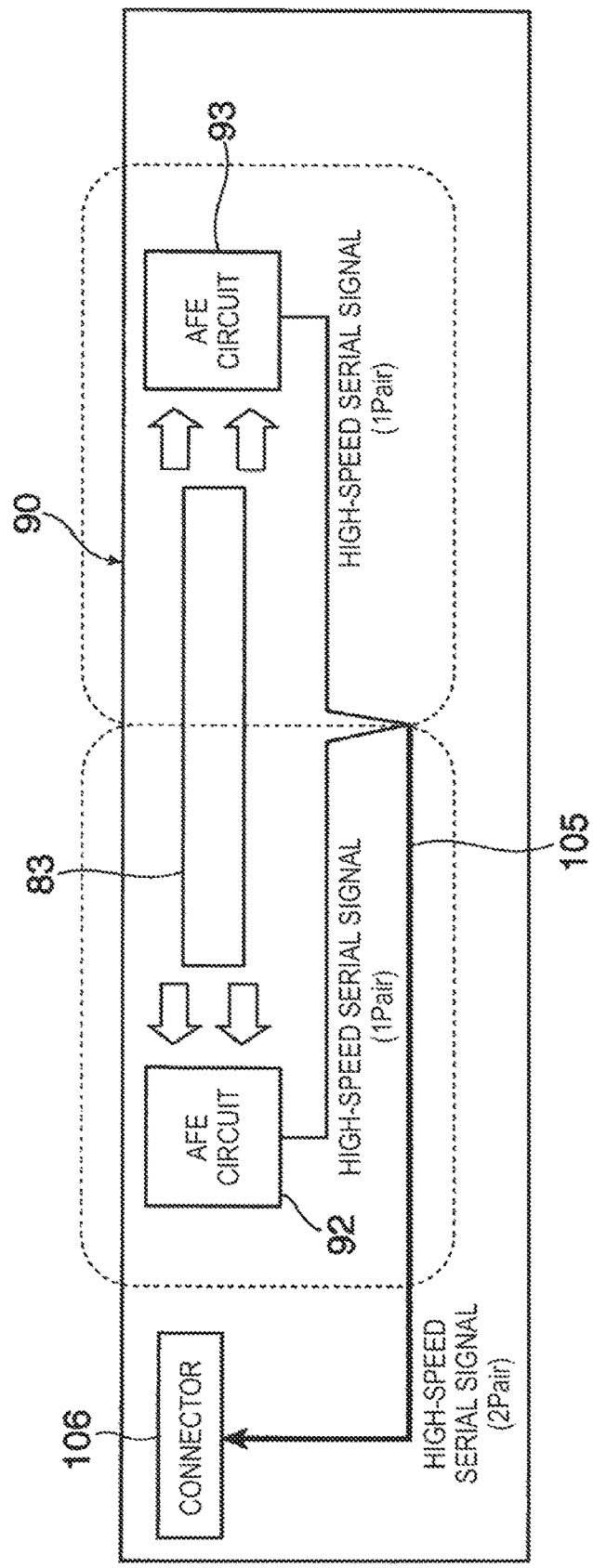
FIG. 9 is a schematic configuration diagram illustrating the image reading substrate according to a third embodiment of the invention.

FIG. 9 is a configuration diagram illustrating an image reading substrate according to a third embodiment of the invention.

In the third embodiment, the first and the second AFE circuits 92 and 93 incorporate functions of a high-speed serial driver as illustrated in FIG. 9.

In the third embodiment, a signal line from the first AFE circuit 92 and a signal line from the second AFE circuit 93 extend to a position that corresponds to the center of the image reading element 83 and are connected to the connector 106 after being bundled into one signal line at the center of the image reading element 83. Thus, the distance of the interconnect from the first AFE circuit 92 to the connector 106 and the distance of the interconnect from the second AFE circuit 93 to the connector 106 are set to be substantially equal.

As such, in the third embodiment, by the first and the second AFE circuits 92 and 93 that incorporate functions of a high-speed serial driver, it is not necessary to convert read signals from the image reading element 83 into LVDS signals. The configuration of the image reading substrate 90 is simplified, and the speed of the read signals output from the image reading element 83 is further increased.

[Fourth Embodiment]

Next, a fourth embodiment will be described with reference to the drawings.

In the fourth embodiment, as illustrated in FIG. 3, the light source 78 that is mounted on the first moving body 85, the reflector 79, the first mirror 80, the second and the third mirrors 81 and 82 that are mounted on the second moving body 87, the image forming lens 84 that is mounted in the casing 31 of the image reading device 3, the image reading element 83, and the image reading substrate 90 constitute a reading unit.

<Configuration of Main Portions of Image Reading Device>

Figure 10:
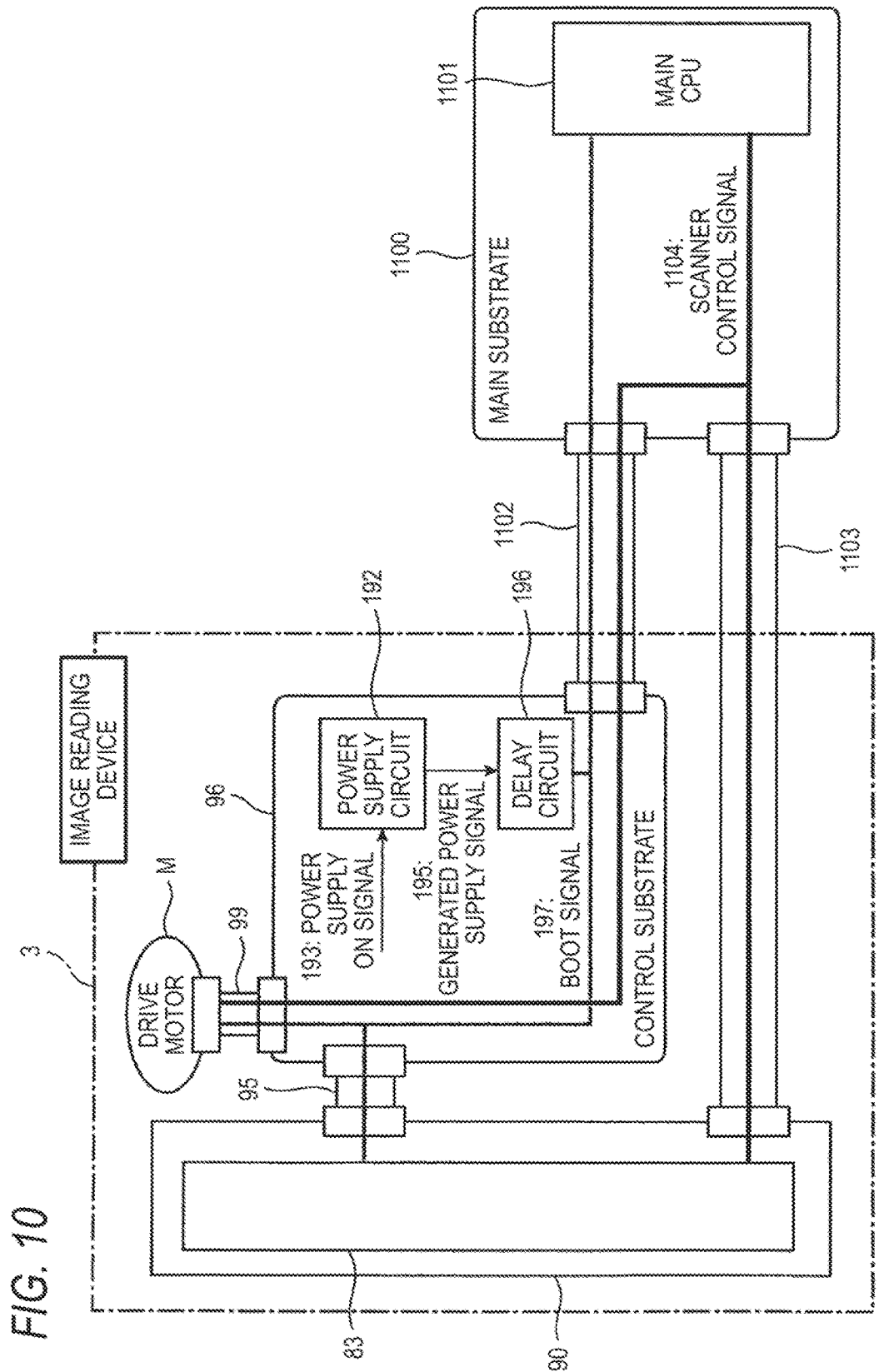
FIG. 10 is a block diagram illustrating the image forming apparatus to which the image reading device according to a fourth embodiment of the invention is applied.

The image reading device 3 according to the fourth embodiment, as illustrated in FIG. 3 and FIG. 10, is provided with the image reading substrate 90 and the control substrate 96. The image reading substrate 90 is an example of a first circuit substrate on which the image reading element 83 is mounted. The control substrate 96 is an example of a second circuit substrate. The control substrate 96 includes a power supply circuit 192 as an example of a power supply circuit that supplies power to the image reading substrate 90, the automatic document transporting device 33 of the image reading device 3, the drive motor M that drives the first and the second moving bodies 85 and 87, and the like.

An alternating current voltage of 100V or the like is conducted in the power supply circuit 192 from a commercial power supply when an unillustrated power supply switch of the image forming apparatus 1 is ON. In addition, when the unillustrated power supply switch of the image forming apparatus 1 is ON, as illustrated in FIG. 10, a power supply ON signal 193 is input into the power supply circuit 192 from the image forming apparatus 1. The power supply circuit 192, as illustrated in FIG. 11, is provided with a power supply generating unit 194 that generates a first direct current voltage of 24 V supplied to the drive motor M and the like and a second direct current voltage of 3.3 V supplied to the image reading element 83 and the image reading substrate 90 when the power supply ON signal 193 is input.

Figure 11:
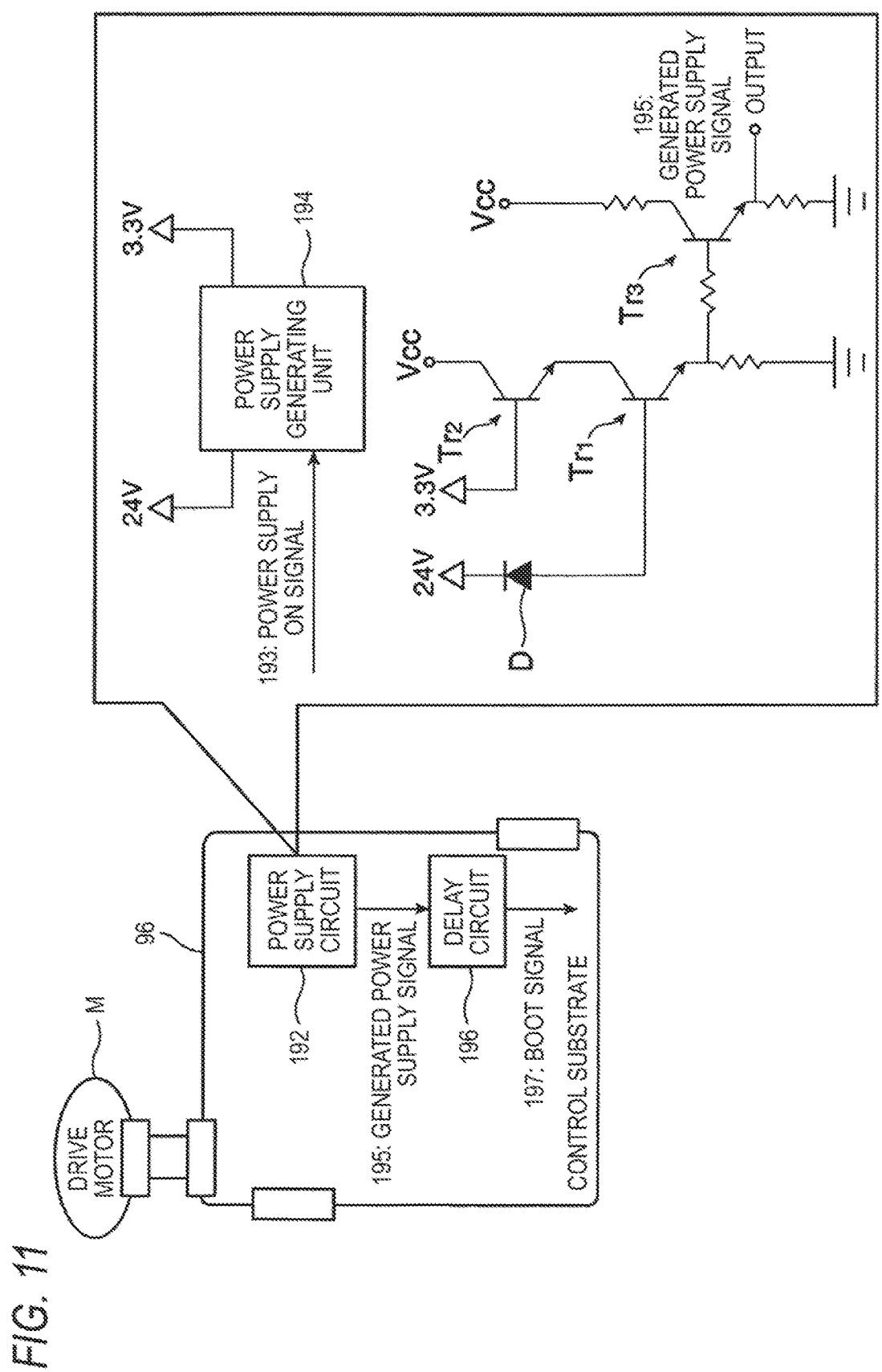
FIG. 11 is a configuration diagram illustrating a relay substrate.

The power supply generating unit 194, as illustrated in FIG. 11, includes a first switching transistor Tr1, a second switching transistor Tr2, and a third switching transistor Tr3. An emitter of the first switching transistor Tr1 is grounded through a resistor. An emitter terminal of the second switching transistor Tr2 is connected to a collector terminal of the first switching transistor Tr1. A base terminal of the third switching transistor Tr3 is connected to the emitter terminal of the first switching transistor Tr1 through a resistor. A direct current voltage of 24 V that is generated by the power supply generating unit 194 is applied to a base terminal of the first switching transistor Tr1 through a diode D that is connected in a reverse direction (a cathode terminal thereof is connected to the power supply voltage of 24 V). A direct current voltage of 3.3 V that is generated by the power supply generating unit 194 is applied to a base terminal of the second switching transistor Tr2. A necessary direct current voltage Vcc that is generated by the power supply generating unit 194 is applied to a collector terminal of the second switching transistor Tr2 and to a collector terminal of the third switching transistor Tr3. An output terminal that outputs a generated power supply signal 195 is connected to an emitter terminal of the third switching transistor Tr3 with a resistor between a ground potential and the output terminal.

A delay circuit 196 as an example of a generating unit is connected to the power supply circuit 192 as illustrated in FIG. 10. The generated power supply signal 195 that is output from the power supply circuit 192 is input into the delay circuit 196. When the generated power supply signal 195 is input from the power supply circuit 192, the delay circuit 196 outputs a boot signal 197 for booting the image reading device 3 after a delay of a predetermined delay period of time (for example, approximately a few 100 msec). The boot signal 197 is output from the image reading device 3 through a below-described third cable 1102 to a main CPU 1101 of a main substrate 1100 that is an example of a main substrate. In addition, the boot signal 197 is output to the image reading substrate 90 and the drive motor M disposed inside the image reading device 3 that has an unillustrated shielded structure. When the boot signal 197 is input, the main CPU 1101, by using software, performs a polling process as a noise removing function of removing noise that is superimposed on the boot signal 197. The polling process means that the state of reception of the boot signal 197 is checked in the software that the main CPU 1101 executes. When the state of reception of the boot signal 197 satisfies a necessary condition, for example, only when the boot signal 197 is received a necessary number of times within a certain period of time, the boot signal 197 is determined to be received, and a scanner control signal 1104 is output.

The control substrate 96 is a relay substrate. The control substrate 96, as illustrated in FIG. 10, is connected to the image reading substrate 90 through the first cable 95 and is connected to the drive motor M through a second cable 99. In addition, the control substrate 96 is connected to the main substrate 1100 through the third cable 1102. The main substrate 1100 is connected to the image reading substrate 90 through a fourth cable 1103. A flexible flat cable (FFC) and the like on which a shielding process is not performed are used as the first to the fourth cables 95, 99, 1102, and 1103.

The main substrate 1100 is provided with the main central processing unit (CPU) 1101 that is an example of a controlling unit for controlling the image reading device 3. The main CPU 1101 outputs the scanner control signal 1104 to the image reading substrate 90, the control substrate 96, and the drive motor M through the third cable 1102 and the fourth cable 1103. The scanner control signal 1104 is used to control the image reading device 3 on the basis of a program that is stored on an unillustrated ROM and the like. The main substrate 1100, for example, is disposed inside the apparatus main body 1a of the image forming apparatus 1. In this case, the main CPU 1101 that is disposed in the main substrate 1100 can double as a CPU that collectively controls the image forming operation of the image forming apparatus 1. The main substrate 1100 may be configured to be disposed inside the casing 31 of the image reading device 3.

The image reading element 83 that is mounted on the image reading substrate 90 performs photoelectric conversion on the optical image of the document 6 that is formed into an image by the image forming lens 84. The image reading substrate 90 generates read data that is an analog or a digital electrical signal on the basis of a signal output from the image reading element 83 and outputs the read data to the control substrate 96. The control substrate 96 has a function of converting the read data output from the image reading substrate 90 into a digital electrical signal when necessary, generating image data by performing predetermined image processing on the read data configured of a digital signal, and outputting the image data to the main substrate 1100. The image processing performed by the control substrate 96 is a process in which parameters, processing methods, and the like for the image processing are predetermined depending on the size of the document 6 and is, for example, a shading correction process, a scaling process, and the like. The control substrate 96 is provided with a function of an output interface and the like that output the image data on which the image processing is performed.

The image processing such as a shading correction process and a scaling process may be configured to be performed by the main substrate 1100, not performed by the control substrate 96. In this case, signals output from the image reading element 83 can be configured to be output to the main substrate 1100 through the fourth cable 1103.

<Action of Main Portions of Image Reading Device>

The image reading device 3 according to the fourth embodiment is booted along with turning on of the power supply of the image forming apparatus 1 and initiates the image reading operation as follows.

Figure 12:
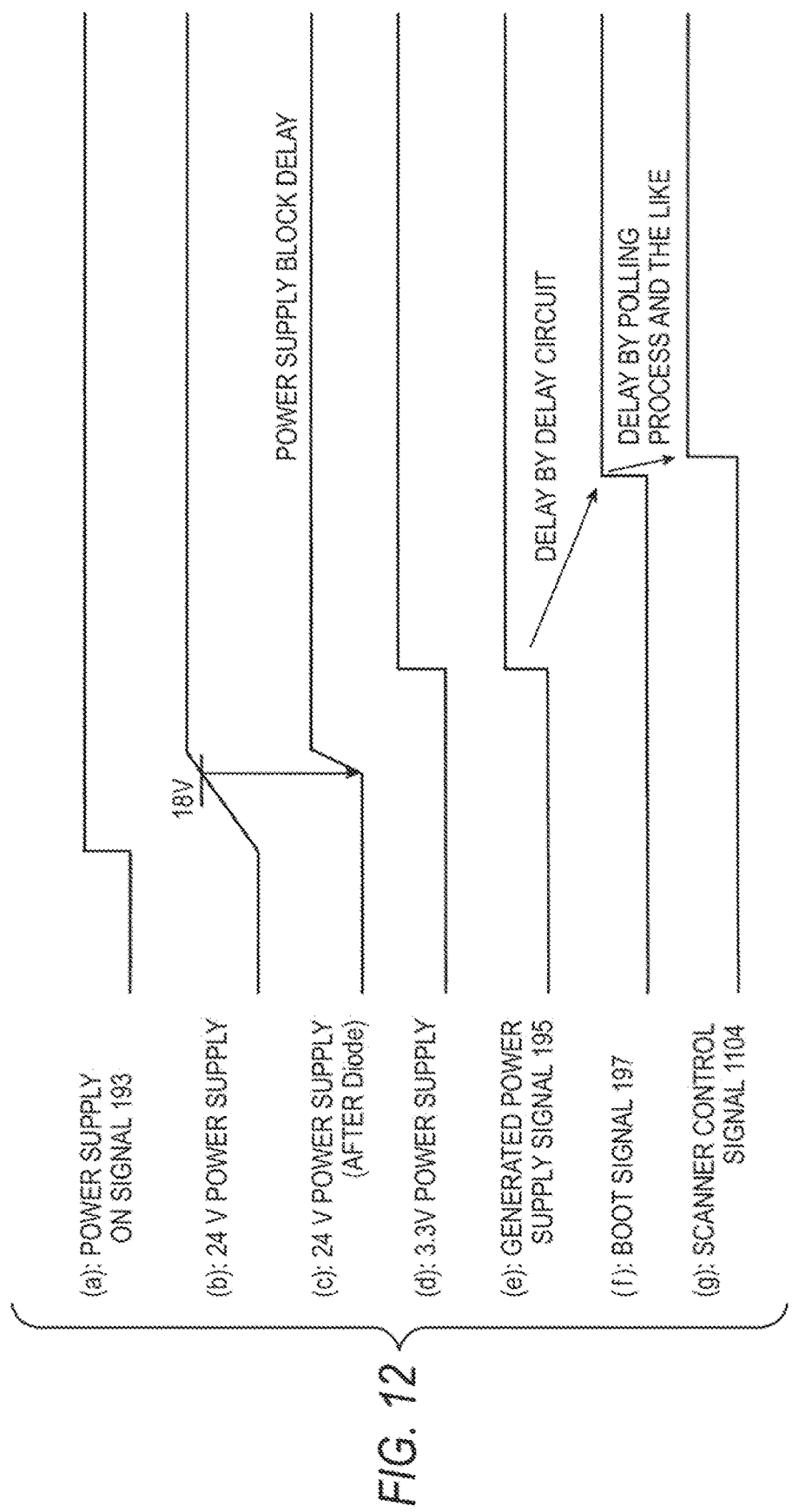
FIG. 12 is a timing chart illustrating an operation of the image reading device according to the fourth embodiment of the invention.

In the image reading device 3, as illustrated in (a) of FIG. 12, the power supply ON signal 193 is input into the power supply circuit 192 of the control substrate 96 when the power supply switch of the image forming apparatus 1 is ON. The power supply circuit 192, as illustrated in (b) of FIG. 12, is conducted to the power supply generating unit 194 when the power supply ON signal 193 is input, and the power supply generating unit 194 raises a direct current voltage to 24 V. The direct current voltage of 24 V that is generated by the power supply generating unit 194 is applied to the base terminal of the first switching transistor Tr1 through the reverse diode D as illustrated in FIG. 11. The diode D is set to have a breakdown voltage of approximately 18 V. When the direct voltage of 24 V that is generated by the power supply generating unit 194 rises and exceeds the breakdown voltage of 18 V, as illustrated in (c) of FIG. 12, a voltage starts being applied to the base terminal of the first switching transistor Tr1. When the base potential of the first switching transistor Tr1 exceeds a necessary threshold, the first switching transistor Tr1 is turned ON.

The power supply generating unit 194, afterward, as illustrated in (d) of FIG. 12, generates and outputs a direct current voltage of 3.3 V on the basis of the direct current voltage of 24 V generated. Then, the direct current voltage of 3.3 V that is generated by the power supply generating unit 194 is applied to the base terminal of the second switching transistor Tr2, and the second switching transistor Tr2 is turned ON. In consequence, a collector current flows in the second switching transistor Tr2 and in the first switching transistor Tr1, and the third switching transistor Tr3 is turned ON. Then, the generated power supply signal 195 that is based on the rise of the first direct current voltage of 24 V and the second direct current voltage of 3.3 V by the power supply circuit 192 is output from the power supply circuit 192, and at the same time, the third switching transistor Tr3 is turned ON as illustrated in (e) of FIG. 12.

The generated power supply signal 195 that is output from the power supply circuit 192 is input into the delay circuit 196 as illustrated in FIG. 10 and FIG. 11. The delay circuit 196, as illustrated in (f) of FIG. 12, outputs the boot signal 197 after causing the generated power supply signal 195 to be delayed by a certain delay period of time.

Figure 13:
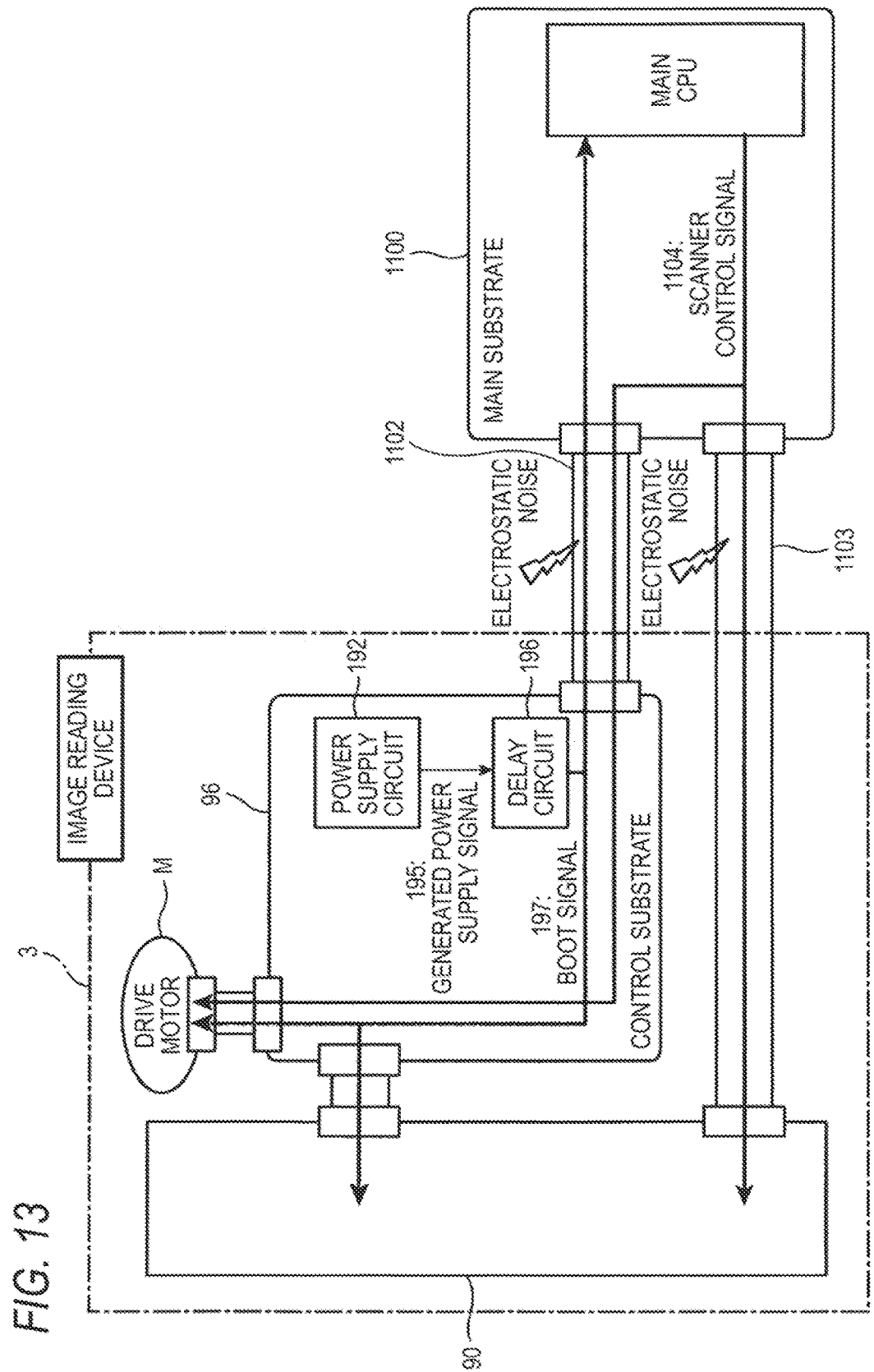
FIG. 13 is a configuration diagram illustrating an operation of the image reading device according to the fourth embodiment of the invention.

The boot signal 197 that is output from the delay circuit 196 is output to the image reading substrate 90, the drive motor M, and the main CPU 1101 of the main substrate 1100 as illustrated in FIG. 13. The image reading substrate 90 is booted on the basis of the boot signal 197 so that the image reading element 83 can read images. The drive motor M becomes rotatable when the boot signal 197 is input. The main CPU 1101 of the main substrate 1100, when the boot signal 197 is input, outputs the scanner control signal 1104 to the image reading substrate 90 and the drive motor M of the image reading device 3 and controls the image reading operation of the image reading device 3.

At this time, in a low humidity environment, clothes and the like of a user who operates the image forming apparatus 1 and the image reading device 3 may be charged to have a high potential due to frictional charging and the like. In such a case, when the user approaches the image forming apparatus 1 or the image reading device 3 or operates the touch panel 112 or the plural operating buttons 113 disposed on the control panel 110 of the image forming apparatus 1 and the image reading device 3, electrostatic noise may be superimposed on the signal that are transmitted through the third cable 1102 or the fourth cable 1103 as illustrated in FIG. 13.

Figure 14:
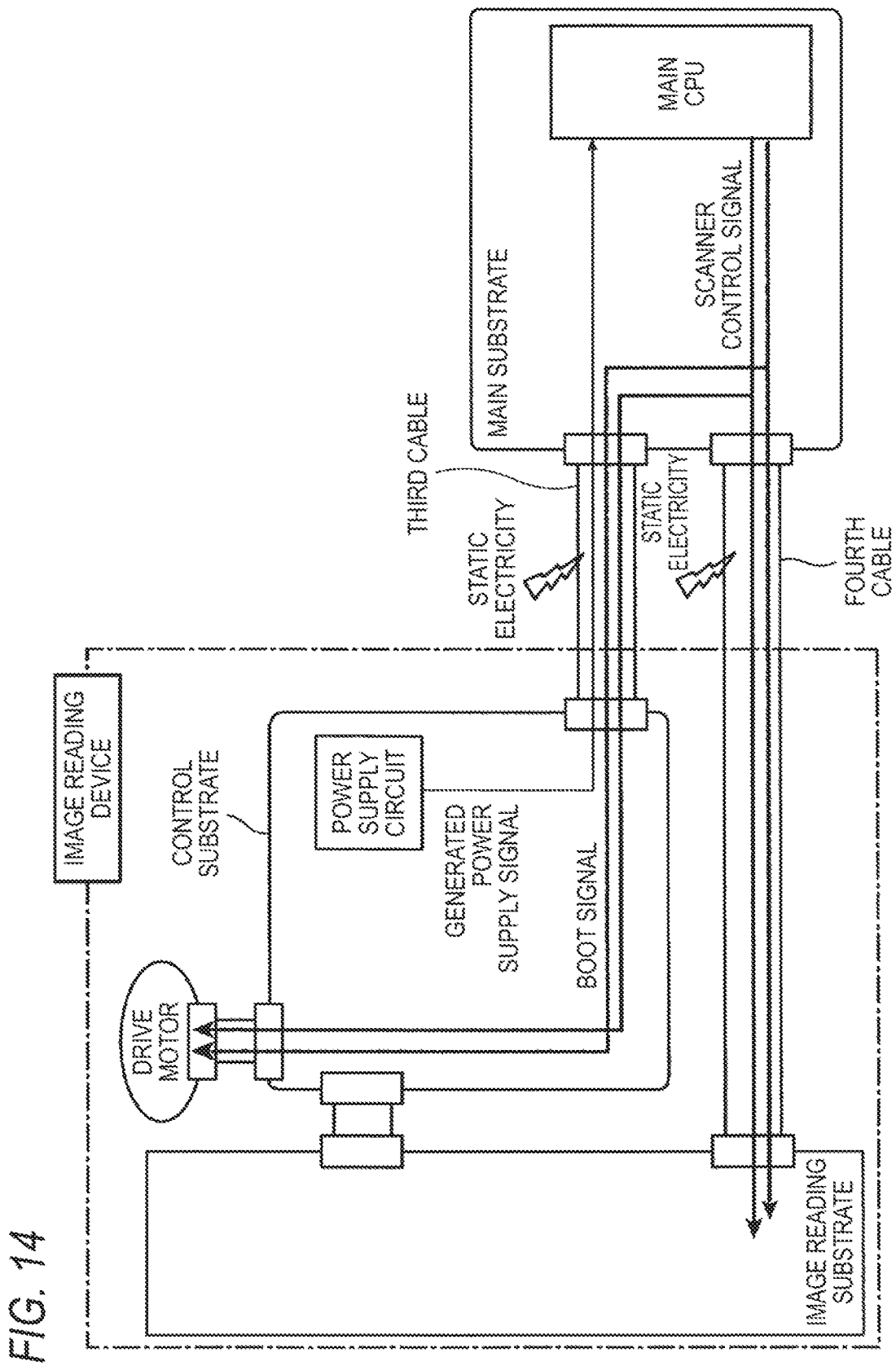
FIG. 14 is a configuration diagram illustrating an operation of an image reading device in the related art.

An image reading device in the related art, as illustrated in FIG. 14, is configured to output the generated power supply signal of the power supply circuit to the main CPU of the main substrate through the third cable, perform a delay process with software by the main CPU, and output the boot signal from the main CPU to the image reading substrate and the drive motor of the image reading device through the third cable and the fourth cable. Thus, when a flexible flat cable (FFC) on which a shielding process is not performed is used as the third cable and the fourth cable, electrostatic noise may be superimposed on the boot signal. As such, when electrostatic noise is superimposed on the boot signal, since the boot signal has the same function as the reset signal, as disclosed in Patent Literature 2, the third cable and the fourth cable as reset signal lines receive the influence of electrostatic noise, and a change in the voltage level is caused. When, in consequence, the voltage level exceeds a threshold, the image reading device malfunctions as if the boot signal is generated, despite the fact that actually the boot signal (reset signal) is not generated. The image reading device may initiate an operation after temporarily returning to an initial state thereof, or in the worst case, the initial state may be continued, and it may be difficult to operate the image reading device when the boot signal is continuously generated.

Therefore, in the image reading device of the related art, in order to avoid the concerns such as difficulty in the operation of the image reading device, a flexible flat cable (FFC) on which a shielding process is performed is used as the third cable and the fourth cable through which the boot signal is transmitted from the main CPU to the image reading device 3. This causes a cost increase.

Regarding this point, as illustrated in FIG. 13, the image reading device 3 of the present embodiment is configured to generate the boot signal 197 inside the image reading device 3 and to output the boot signal 197 only in a direction toward the main substrate 1100 of the image forming apparatus 1 from the image reading device 3. Thus, in the image reading device 3 of the present embodiment, a concern that the image reading device 3 malfunctions such that the image reading device 3 is reset by the boot signal 197 does not exist or is reduced even when electrostatic noise is superimposed on the boot signal 197. In consequence, in the present embodiment, the operation of the image reading device 3 is stabilized, and it is possible to use an inexpensive flexible flat cable (FFC) on which a shielding process is not performed as the third cable 1102 and the fourth cable 1103 through which the boot signal 197 is transmitted to the image reading device 3. Thus, a cost increase is suppressed.

The main CPU 1101 can remove or avoid the influence of electrostatic noise with software by performing the polling process and the like even when the boot signal 197 on which electrostatic noise is superimposed is input into the main CPU 1101 of the main substrate 1100. Thus, malfunctioning of the main CPU 1101 accompanied by the boot signal 197 on which electrostatic noise is superimposed being input into the main CPU 1101 is avoided or suppressed.

In the present embodiment, the main CPU is configured to control the image forming apparatus in addition to the image reading device that the main CPU originally controls, and the main CPU used has comparatively high function. Thus, it is comparatively easy to additionally perform a process of removing or avoiding the influence of noise. However, when the process of removing or avoiding the influence of noise is performed by the power supply circuit on the image reading, device side, this causes the size and cost of the image reading device to increase.

As such, according to the image reading device 3 of the above embodiments, the influence of electrostatic noise that may be superimposed on the boot signal 197 is suppressed while the transmission path of the boot signal becoming complicated is avoided, in comparison with a case where the boot signal 197 is transmitted in plural ways.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading substrate comprising:
   an image reading element that assigns read signals of an image to plural output terminals and outputs the read signals;
   at least one high-speed serial transmitting driver that is connected to the plural output terminals; and
   an outputting unit that outputs a high-speed serial signal outside, the high-speed serial signal being transmitted from the high-speed serial transmitting driver,
   wherein at least distances of plural separated interconnects from the plural output terminals to the high-speed serial transmitting driver are set to be equal to each other.

2. The image reading substrate according to claim 1,
   wherein the plural output terminals are arranged across a longitudinal direction of the image reading element, and
   the high-speed serial transmitting driver is arranged on a center line at an approximately center of the image reading element in a short direction of the image reading element.

3. The image reading substrate according to claim 1,
   wherein a ground electrode is arranged on at least one side of the interconnect.

4. An image reading device comprising:
   an illuminating unit that illuminates a document; and
   an image reading unit that reads an image of reflective light from the document,
   wherein the image reading substrate according to claim 1 is used as the image reading unit.

5. An image forming apparatus comprising:
   an image reading device that reads an image of a document; and
   an image forming unit that forms the image of the document that is read by the image reading device,
   wherein the image reading device according to claim 4 is used as the image reading device.

6. An image reading substrate comprising:
   an image reading element that assigns read signals of an image to plural output terminals and outputs the read signals;
   plural signal adjusting units that adjusts the read signals that are output from the plural output terminals;
   at least one high-speed serial transmitting driver that is connected to at least one of the plural signal adjusting units; and
   an outputting unit that outputs a high-speed serial signal outside, the high-speed serial signal being transmitted from the high-speed serial transmitting driver,
   wherein at least distances of plural separated interconnects from the at least one of the plural signal adjusting units to the high-speed serial transmitting driver are set to be equal to each other.

7. The image reading substrate according to claim 6,
   wherein the plural signal adjusting units are arranged across a longitudinal direction of the image reading element, and
   the high-speed serial transmitting driver is arranged on a center line at an approximately center of the image reading element in a short direction of the image reading element.

8. The image reading substrate according to claim 6,
   wherein the signal adjusting unit includes an A/D converter that performs analog/digital conversion on the read signals.

9. The image reading substrate according to claim 6,
   wherein the signal adjusting unit is configured of an analog front end circuit.

10. The image reading substrate according to claim 6, further comprising:
    the at least one high-speed serial transmitting driver is formed of one high-speed serial transmitting driver,
    wherein the distances of interconnects from the plural output terminals of the image reading element to the plural signal adjusting unit are set to be equal, and the distances of the interconnects from the plural signal adjusting unit to the high-speed serial transmitting driver are set to be equal.

11. The image reading substrate according to claim 6, further comprising:
    the at least one high-speed serial transmitting driver is formed of plural high-speed serial transmitting drivers corresponding to the plural signal adjusting units,
    wherein the distances of the interconnects from the plural signal adjusting units to the corresponding plural high-speed serial transmitting drivers are set to be equal, and the distances of interconnects from the plural high-speed serial transmitting drivers to the outputting unit are set to be equal.

12. The image reading substrate according to claim 6,
    wherein the plural signal adjusting units have a function as the high-speed serial transmitting driver, and the distances of interconnects from the plural signal adjusting units to the outputting unit are set to be equal.

* * * * *